2,752,353
DEHYDRATION OF 3-CYANO-4-CARBOXAMIDE-6-METHYL-2-PYRIDONE

John Song, North Plainfield, and John Edson Gordon, Boonton, N. J., assignors to American Cyanamid Company, New York, N. Y., a corporation of Maine No Drawing. Application March 5, 1954,
Serial No. 414,511

7 Claims. (Cl. 260—294.9)

This invention relates to an improved process for the preparation of 3,4-dicyano-6-methyl-2-pyridone by dehydrating 3-cyano-6-methyl-2-pyridone-4-carboxamide.

The dehydration of 3-cyano-6-methyl-2-pyridone-4-carboxamide has been effected in the past by means of phosphorus pentachloride, oxychloride or thionyl chloride. These processes have not been entirely satisfactory. Where no solvent other than the dehydrating agent is used a large excess of the agent is needed. Also the agents are not good solvents for the product produced. An attempt has been made to overcome these difficulties by using phosphorus oxychloride with pyridine as a solvent. The use of pyridine gives yields which are insignificant and no practical commercial process can be based thereon.

The present invention is based on the discovery that the formation of large amounts of the chlorinated by-product can be largely or completely eliminated by using a reaction medium having chloroform as its predominant constituent. The chloroform can be pure or associated with smaller amounts of homologues such as methyl chloroform. The desired reaction results in the evolution of HCl and so it is necessary that there be present sufficient acid binding agent to react with all of the HCl evolved. The acid binding agent may be any suitable compound which is capable of reacting with hydrochloric acid to produce inert or substantially inert reaction products. We have found that the acid binding agent can advantageously be a coal tar base such as pyridine or its homologues or mixtures thereof. Other acid binding agents such as triethylamine are also usable. The amount of pyridine base which is used in the preferred form of the present invention must be strictly limited as there is by-product chlorination in the 2 position of the pyridone ring of the amount of pyridine base exceeds 30% by weight of the solvent. Lower amounts of pyridine give better yields up to a maximum with a solvent which is 78% chloroform. Above this ratio no appreciable increase in yield is observable. If the pyridine base is used as the acid binding agent, there is, of course, a limit below which the pyridine cannot drop, but as the solvent is preferably used in large excess, sufficient acid binding agent is present even though the pyridine base content of the solvent is quite low.

The amount of solvent used should be in large excess. In general, at least 6 parts of solvent per part of the carboxamide should be used. Smaller amounts result in increased by-product formation with lower yields. Larger excesses give somewhat better yield up to about 8.6:1, beyond which still larger excesses of solvent result in no improvement in yield and only add to the cost, although the excess can be considerably above 8.5 without having any appreciable adverse effect on the yield.

The amount of phosphorus oxychloride used should also fall within certain limits for best results. There is a material falling off in yield if less than 0.8 part of phosphorus oxychloride per part of carboxamide is employed. Optimum results are obtained when they are present in about equal amounts but an excess of phosphorus oxychloride does not result in any additional gain. A small amount of excess is entirely practical but a large excess begins to increase the formation of chlorinated by-product. Therefore, the excess should be maintained below the point at which there is any substantial increase in by-product formation.

The temperature range for satisfactory operation is about 55–70° C. Optimum results are obtained in the range of 60–65° C., which range can easily be maintained by permitting the chloroform to reflux.

The manipulative steps in the process are not critical but it should be realized that the reaction is exothermic and can get out of control if temperatures are permitted to rise too rapidly. Without limiting the invention to an exact order of steps, it is preferred to add the 3-cyano-6-methyl-2-pyridone-4-carboxamide to a cool mixture of the chloroform solvent and phosphorus oxychloride. The mixture is then heated to a range of 55–70° C. until the reaction is complete, whereupon the mixture is drowned in cold water or ice and the drowned mixture refluxed to decompose soluble complexes. Steam distillation may then be used to remove the chloroform, whereupon it is possible to crystallize out all of the product by cooling the residual slurry to 5° C. or below.

The invention will be described in further detail in conjunction with the following example in which the parts are by weight unless otherwise specified.

*Example*

To a mixture of 670 parts of chloroform, 189 parts of pyridine, and 100 parts of phosphorus oxychloride held below 20° C. is added with stirring 100 parts of 3-cyano-6-methyl-2-pyridone-4-carboxamide. The mixture is very slowly heated to a temperature of 60° C. and is then stirred at 60–69° C. until the reaction is substantially complete. The reaction mixture is drowned below 10° C. on 250 parts of ice and the drowned mixture is heated to reflux until all complexes have decomposed. The chloroform is then removed by steam distillation and the residual slurry is cooled to 5° C. The product is isolated by filtration, washed, and dried. It is a good yield of 3,4-dicyano-6-methyl-2-pyridone.

What is claimed is:

1. A process of producing 3,4-dicyano-6-methyl-2-pyridone which comprises heating 3-cyano-6-methyl-2-pyridone-4-carboxamide with at least 0.8 part of phosphorus oxychloride per part of amide and less than sufficient to produce substantial chlorination in at least 6 parts of a reaction medium composed of at least 70% of an $\alpha,\alpha,\alpha$ trichloroalkane of not more than two carbon atoms, the heating taking place in the presence of sufficient acid binding agent to react with all of the hydrochloric acid evolved in the reaction, the reaction temperature being maintained at 55–70° C. until dehydration is substantially complete.

2. A process according to claim 1 in which the acid binding agent is a pyridine base.

3. A process according to claim 2 in which the temperature of the reaction mixture is maintained at 60–65° C.

4. A process according to claim 3 in which the mixture is subsequently drowned in cold water and the drowned mixture heated under reflux for a sufficient time to decompose soluble complexes.

5. A process according to claim 1 in which the mixture is subsequently drowned in cold water and the drowned mixture heated under reflux for a sufficient time to decompose soluble complexes.

6. A process according to claim 1 in which the amount of phosphorus oxychloride is approximately equal to the weight of the carboxamide.

7. A process according to claim 6 in which the acid binding agent is a pyridine base.

References Cited in the file of this patent

UNITED STATES PATENTS

| | | |
|---|---|---|
| 2,310,171 | Carlson | Feb. 2, 1943 |
| 2,459,128 | Fahrenbach | Jan. 11, 1949 |